US009712809B2

(12) United States Patent
Ollila

(10) Patent No.: US 9,712,809 B2
(45) Date of Patent: Jul. 18, 2017

(54) INTEGRATED DIGITAL CAMERA PLATFORM WITH NIR APODIZATION FILTER FOR ENHANCED DEPTH SENSING AND IMAGE PROCESSING

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 14/720,463

(22) Filed: May 22, 2015

(65) Prior Publication Data

US 2016/0344996 A1 Nov. 24, 2016

(51) Int. Cl.
*H04N 13/00* (2006.01)
*H04N 5/33* (2006.01)
*H04N 13/02* (2006.01)

(52) U.S. Cl.
CPC ......... *H04N 13/0253* (2013.01); *H04N 5/332* (2013.01); *H04N 13/0271* (2013.01)

(58) Field of Classification Search
CPC . H04N 13/0253; H04N 13/0271; H04N 5/332
See application file for complete search history.

(56) References Cited

U.S. PATENT DOCUMENTS

| 2008/0087800 A1 | 4/2008 | Toda |
| 2010/0045809 A1 | 2/2010 | Packard |
| 2011/0242684 A1* | 10/2011 | Shinohara ............. G02B 13/18 359/738 |
| 2013/0294684 A1 | 11/2013 | Lipton et al. |
| 2014/0347493 A1* | 11/2014 | Higashitsutsumi .. H04N 5/2254 348/164 |

(Continued)

FOREIGN PATENT DOCUMENTS

| JP | 2008091753 | 4/2008 |
| KR | 1020140030658 | 3/2014 |

OTHER PUBLICATIONS

International Search Report and Written Opinion for PCT Application No. PCT/US16/28152 mailed Aug. 29, 2016, 15 pages.

(Continued)

*Primary Examiner* — Sath V Perungavoor
*Assistant Examiner* — Howard D Brown, Jr.
(74) *Attorney, Agent, or Firm* — Green, Howard, & Mughal LLP.

(57) ABSTRACT

Digital visible light (RGB) cameras incorporating an NIR apodization filter having a gradual transmission for at least the NIR band. In some embodiments, the NIR apodization filter is incorporated into a camera module having a single aperture. The NIR apodization filter may effectively reduce the NIR aperture size relative to the RGB aperture size. In some embodiments, the different depth of field (DOF) associated with the different aperture sizes is employed to compute depth information for a scene (e.g., through a sharpness disparity function). In further embodiments, other image processing is based on the enhanced NIR information collected by a single-lens CM, or a multi-camera implementation where at least one CM of a multi-camera platform incorporates an NIR apodization filter.

19 Claims, 13 Drawing Sheets

(56) References Cited

U.S. PATENT DOCUMENTS

2015/0062413 A1\* 3/2015 Yokoya ............... H04N 5/2354
 348/363
2015/0062414 A1\* 3/2015 Hirasawa ............... H04N 5/238
 348/363
2015/0304631 A1 10/2015 Lee

OTHER PUBLICATIONS

Salamati et al., "Material-Based Object Segmentation Using Near-Infrared Information" Presented at: IS&T/SID 18th Color and Imaging Conference (CIC), San Antonio, Texas, Nov. 8-12, 2010; Published in: IS&T/SID 18th Color Imaging Conference (CIC), p. 196-201; 2010 (6 pages).
Salamati et al,."Semantic Image Segmentation Using Visible and Near-Infrared Channels" Published in: Proceeding ECCV'12 Proceedings of the 12th international conference on Computer Vision—vol. 2 pp. 461-471; Springer-Verlag Berlin, Heidelberg 2012 (11 pages).
Sadeghipoor et al. "Joint Acquisition of RGB and NIR Images with the Bayer CFA" EPFL-IC-IVRG; Dec. 4, 2013 (64 pages).

\* cited by examiner

INTEGRATED DIGITAL CAMERA PLATFORM WITH NIR APODIZATION FILTER FOR ENHANCED DEPTH SENSING AND IMAGE PROCESSING

BACKGROUND

A digital camera is a component now often integrated into commercial electronic media device platforms. Digital camera platforms are now available in wearable form factors (e.g., video capture earpieces, video capture headsets, video capture eyeglasses, etc.), as well as other mobile computing platforms, such as smartphones, tablet computers, and notebook computers, etc. Three-dimensional (3D) cameras are now becoming more common, and can be found on many mobile computing devices/platforms. These devices provide enhanced entertainment and utility experiences to an end user. For example, photography may be enhanced by depth information output from the 3D camera. 3D cameras may be implemented with a plenoptic light field camera or by including multiple 2D cameras on a platform (e.g., stereo imaging systems).

Some digital camera hardware modules (CM) utilized in various integrated or embedded computing platforms incorporate an image sensor, such as a CMOS sensor, that is inherently responsive to near-infrared (NIR) wavelengths as well as visible light (RGB) wavelengths. Typically, for the sake of optimal RGB reproduction, a CM includes a hot mirror that blocks substantially all of the NIR from the image sensor. More recently, digital camera designers have been considering architectures and techniques that utilize NIR responsivity of a sensor. Such architectures often simply entail removing the hot mirror from the CM. Doing so however, re-introduces the problems that originally led its use. Camera systems capable of leveraging the NIR band for enriching an RGB image, for example to determine depth information more robustly, without significant loss to RGB quality are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
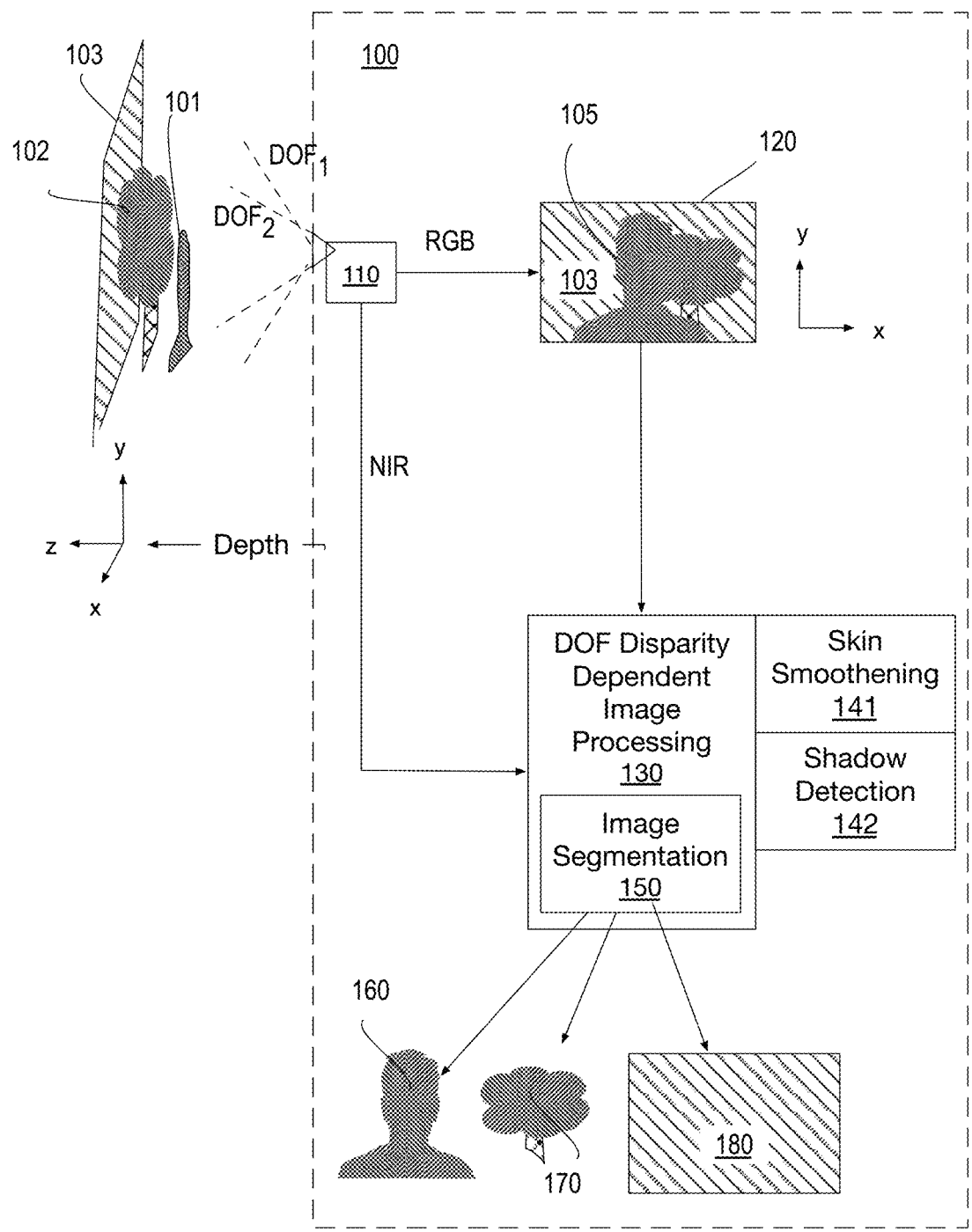
FIG. 1 is a schematic of an integrated digital camera platform with a single lens system configured to collect depth information in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example with a programmable microprocessor, vector processor, or ASIC. Certain portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for digital RGB cameras incorporating an NIR apodization filter (NIRAF). As used herein, the RGB band extends between 400 nm up to 700 nm while the NIR band extends from about 701 nm to at least 1200 nm. Rather than fully blocking a sensor's exposure to NIR (e.g., with a hot mirror in the optical path) or employing a clear (binary) aperture, the NIR apodization filter has a gradual transmission for at least the NIR band. In some embodiments, the NIR apodization filter is incorporated into a camera module having a single aperture. In contrast to a multi-aperture system where separate binary apertures are selective to either RGB or NIR, an NIR apodization filter can enable a higher NIR resolution for comparably dimensioned single aperture embodiments. In single aperture embodiments, an NIR apodization filter that transmits RGB may further function to differentiate the effective aperture size for the NIR band from that for RGB band. Specifically, the NIR apodization filter may effectively reduce the NIR aperture size relative to the RGB aperture size. In some embodiments, the different depth of field (DOF) associated with the band-selective aperture sizes is employed to compute depth information for a scene, for example through a sharpness disparity function. In further embodiments, other image processing is based on the enhanced NIR information collected by a single-lens CM, or a multi-camera implementation where at least one camera of a multi-camera integrated platform incorporates an NIR apodization filter.

Also of note, some single-aperture embodiments described herein may operate more robustly over various operating temperatures than competitive multi-aperture implementations. Single-aperture embodiments may also be relatively less expensive to implement, and provide better control over camera resolution by enabling more robust camera module manufacture. Furthermore, with depth information deduced from a single viewpoint, embodiments may also advantageously simplify a mapping between depth information and RGB information relative to a multiple camera/field of view implementation that may require more complex pixel correspondence calculations across multiple viewpoints.

In some embodiments, an integrated digital camera platform includes one or more CM having an NIR apodization filter, and is operable to output RGB and NIR image data. FIG. 1 is a schematic of an integrated digital camera platform 100 with an embedded CM 110 having a single lens system. Integrated digital camera platform 100 may be any known in the art, such as, but not limited to: an image/video capture earpiece; image/video capture headset; smartphone; or other mobile or stationary computing platform (e.g., tablet computer, notebook computer, handheld image/video camera, or vehicle machine vision platform).

CM 110 employs an image sensor to generate image data frames representing an optical path through a single aperture that provides a first, smaller, DOF ($DOF_1$) and a second, larger DOF ($DOF_2$). In some embodiments, CM 110 is to generate RGB image data associated with the smaller DOF. The RGB image data may be in any form, such as, but not limited to, raw color channel data values spatially correlated to predetermined scene positions. CM 110 is further to generate NIR image data. In some embodiments, CM 110 is to generate NIR image data associated with the larger DOF. The NIR image data may be in any form, such as, but not limited to, raw NIR intensity data values spatially correlated to various scene positions.

In some embodiments, an integrated digital camera platform includes a microprocessor to receive from the CM input image data that includes at least RGB and NIR data. As further illustrated in FIG. 1, platform 100 further includes one or more microprocessor operable to generate and/or store a 2D image frame 120 as a representation of a real world scene based on received raw RGB data. In the illustrated example, image frame 120 includes a representation 105 of a real world foreground object 101 (e.g., subject person), a real world background object 102 (e.g. tree), and a real world background object 103 (e.g., sky). Platform 100 further includes one or more microprocessor operable to implement DOF disparity dependent image processing 130 based, at least in part, on the NIR image data and RGB image data received as an input from CM 110.

In some embodiments, DOF disparity dependent image processing 130 entails least a computation of depth values spatially correlated to various scene positions captured in 2D image frame 120. The one or more microprocessor of platform 100 may be further operable to perform additional image processing based on this depth information. As one example, RGB image data may be further processed based on depth information in an image frame segmentation operation 150 distinguishing a foreground object 160 from a background object 170 and/or background object 180. An indication of these image segments may be stored to an electronic memory of platform 100 in association with RGB image data frame 120, for example to assist with subsequent image editing. Whereas color or texture information available by processing RGB image data alone may be insufficient to properly segment a single object having multiple colors, depth-based techniques may be more robust. Such depth-based techniques may be even more advantageous when further applied to the more accurate depth information available through one or more of the DOF disparity dependent image processing embodiments described herein.

In some embodiments, DOF disparity dependent image processing 130 implemented by platform 100 further includes skin smoothening operation 141. In still other embodiments, the one or more microprocessor of platform 100 may be further operable to perform any number of image processing techniques based on the NIR data received from CM 110, such as, but not limited to shadow detection operation 142.

Figure 2A:
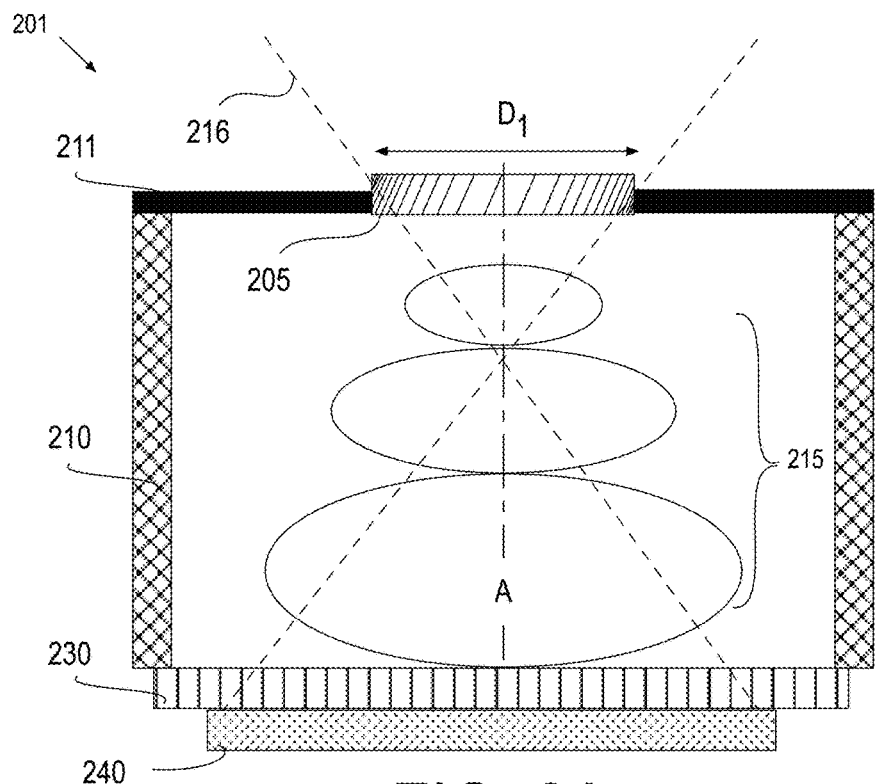
FIGS. 2A and 2B sectional views of a camera hardware module including an NIR apodization filter, in accordance with some embodiments.
Figure 2B:
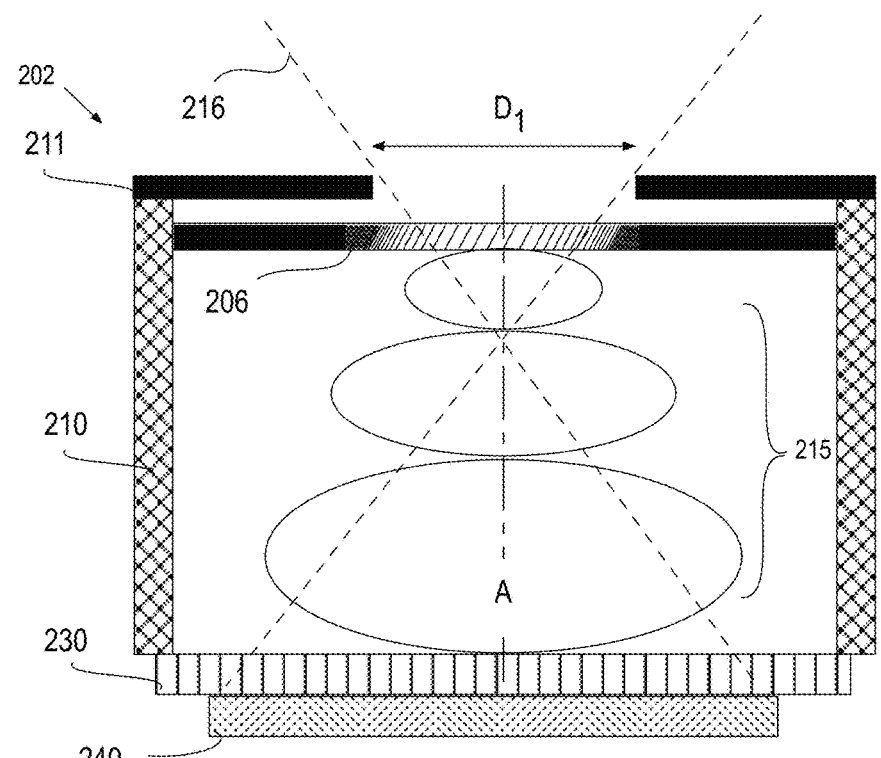

In some embodiments, CM hardware having a single aperture includes an NIR apodization filter. FIGS. 2A and 2B sectional views of exemplary CM 201 and 202, respectively, in accordance with some embodiments. In reference to FIG. 2A, CM 201 includes a digital image sensor 240. Image sensor 240 may be of any known digital sensor architecture (such as, but not limited to, a CMOS sensor), which offers sufficient responsivity within the RBG band and also the NIR band. Image sensor 240 is coupled to a body 210 that may be of any conventional material and structure. Body 210 houses a lens system 215 including one or more lens. Lens system 215 is to provide an optical path 216 between image sensor 240 and an aperture in a body portion 211, which is of a material non-transmissive over both the RGB and NIR bands. Lens system 215 may be any lens system known as embodiments are not limited in this respect. As illustrated in FIG. 2A, the aperture in body portion 211 has a diameter $D_1$ that is aligned with the lens system optical axis A. Embodiments are not limited with respect to aperture diameter, but as one example, the aperture diameter may be approximately 4 mm. A filter array 230, which passes both NIR and RGB within at least some portions of image sensor 240, is disposed within optical path 216. In one exemplary embodiment, filter array 230 is a Bayer color filter array (CFA). In other embodiments, filter array 230 is an NIR-enhanced filter array (e.g., where half of green filter tiles of the Bayer mosaic are replaced with a cold mirror).

Figure 3A:
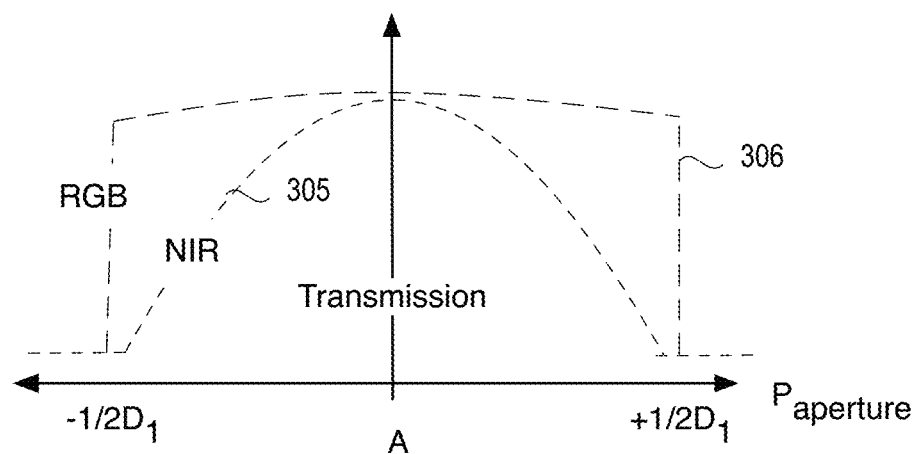
FIG. 3A is a graph illustrating an NIR transmission profile of an NIR apodization filter, in accordance with some embodiments.

Also within optical path 216 is an NIR apodization filter (NIRAF) 205. In accordance with some embodiments, NIRAF 205 has a continuously varying transmission profile within the NIR band. NIRAF 205 is to be distinguished from an NIR cut filter that might be opened to define a binary NIR aperture in a multi-aperture system. In exemplary embodiments, NIRAF 205 has an inverse bullseye pattern where NIR transmission is lowest (e.g., 0%) proximate to the edges of the opening in body portion 211 (e.g., $+/- \frac{1}{2} D_1$ from optical axis A), and highest (e.g., 100%) proximate to the optical axis A. FIG. 3A is a graph illustrating an NIR transmission profile 305 of an NIR apodization filter over an aperture diameter $D_1$, in accordance with some embodiments. In some exemplary embodiments, NIR transmission profile 305 is non-linear and is more specifically Gaussian, or an approximation thereof. As noted above, an apodized aperture offers higher resolution and produces a higher sharpness over an entire image area by removing edge diffraction limitations (visible in a comparison of Airy and apodized point spread functions). While a Gaussian transmission change advantageously maximizes the resolution of CM 201 within the NIR band, an NIR apodization filter in accordance with other embodiments may have an NIR transmission profile varying by any other continuous function.

In some embodiments, the transmission profile over optical path 216 for the NIR band is different than for the visible band. For example, only part of the spectrum for which the image sensor 240 is responsive is apodized, and more specifically apodization may be selective to the NIR band that may be ultimately excluded from a processed RGB image data frame. In the exemplary embodiment illustrated in FIG. 2A, NIRAF 205 maintains a non-zero (e.g., 75%, or more) transmission profile within the RGB band over the entire aperture diameter $D_1$, such that body portion 211 defines a binary aperture of diameter $D_1$ for the RGB band. In other words, NIRAF 205 is an RGB pass filter. In further embodiments where NIRAF 205 has lowest (e.g., 0%) NIR transmission at the maximum aperture radius and increases gradually as a function of decreasing aperture radius, NIRAF 205 defines an effective NIR band aperture that is smaller than $D_1$.

FIG. 3A further illustrates an exemplary RGB transmission profile 306 that is nearly flat over the entire aperture of diameter $D_1$, but passes NIR only over an inner portion of the diameter $D_1$. RGB transmission profile 306 in this example varies only slightly as a function of radial distance from the optical axis A, but by significantly less than NIR transmission profile 305. The RGB transmission profile 306 may, in the alternative, continuously spatially vary by a more significant amount such that the RGB band conveyed over the optical path 216 (FIG. 2A) is also significantly apodized, although distinctly from the NIR band such that the effective NIR aperture remains smaller than the effective RGB band aperture.

FIG. 2B illustrates an alternative embodiment where CM 202 again includes only one aperture of diameter $D_1$ through which both RGB and NIR bands pass. CM 202 further includes an NIRAF 206 disposed within the optical path. In this embodiment, NIRAF 206 is contained within CM body 210, for example between the aperture defined by body portion 211 and lens system 215. As a function of capabilities of a given manufacturing facility, a CM with NIR apodization filter of the architecture illustrated in either FIG. 2A or 2B may be more readily implemented.

Figure 2C:
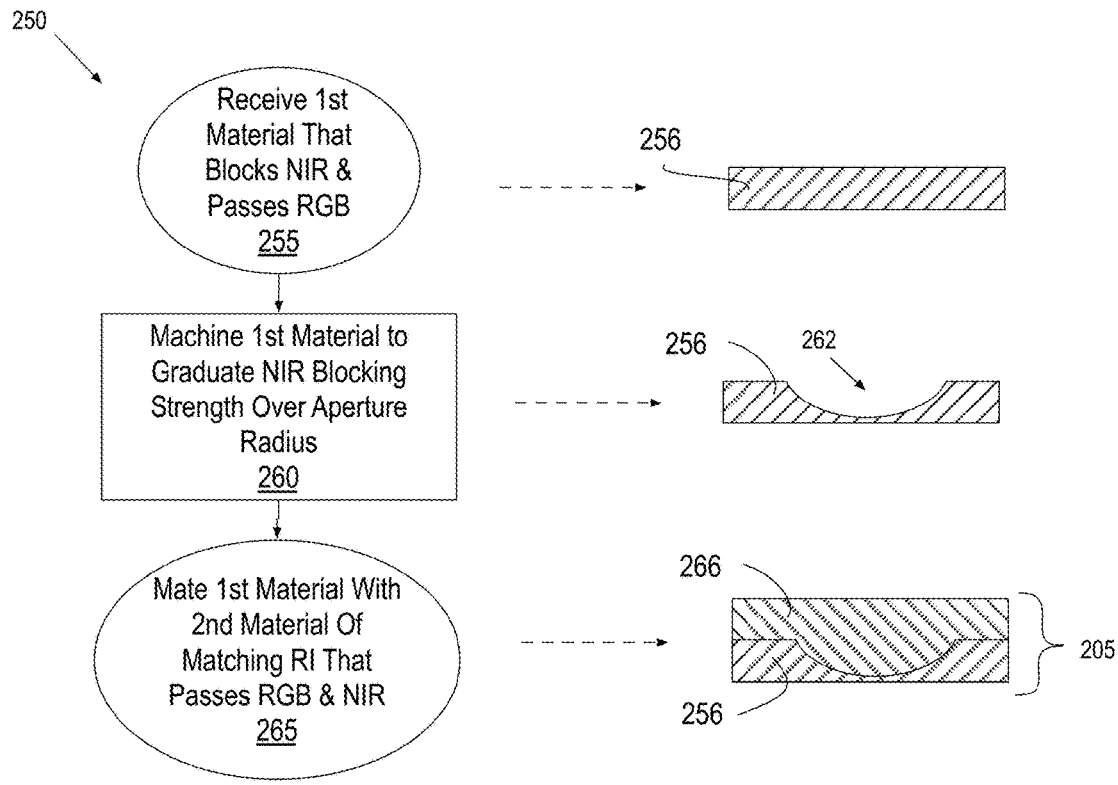
FIGS. 2C and 2D are flow diagrams and corresponding filter cross-sections illustrating methods of forming an NIR apodization filter, in accordance with some embodiments.
Figure 2D:
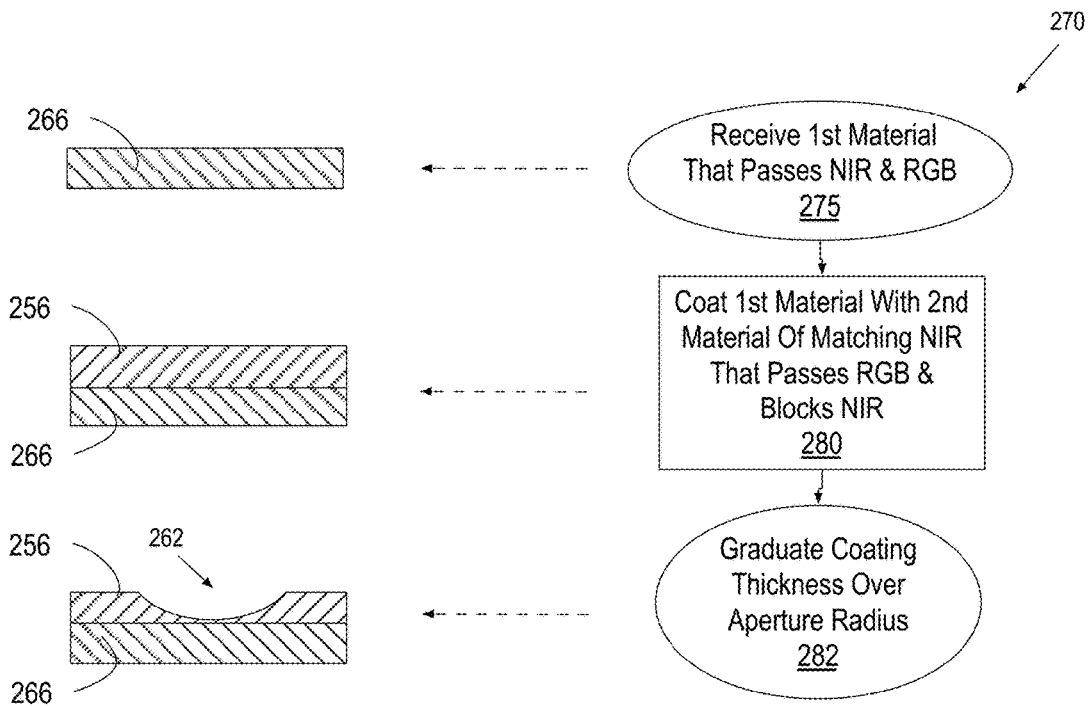

FIGS. 2C and 2D are flow diagrams and corresponding optical filter cross-sections illustrating methods of forming an NIR apodization filter, in accordance with some embodiments. Either of these methods may be practiced to fabricate the NIRAF 205 or 206 illustrated in FIG. 2A, or 2B, respectively. Referring first to FIG. 2C, filter fabrication method 250 begins with receiving a first material that blocks the NIR band and passes the RGB band. Transmission of the RGB band through the first material need not be 100%, but is advantageously at least 50% and more advantageously 75%, or more. NIR blocking by the first material likewise need not be 100%, but is advantageously 80%, or more. In some embodiments, the material received at operation 255 is a commercially available neutral density filter material 256. At operation 260, the first material is micromachined (e.g., etched, milled, etc.) to graduate the NIR blocking strength spatially over the aperture radius. In one exemplary embodiment, a parabolic recess 262 is machined into neutral density filter material 256 to reduce material thickness and NIR blocking strength. At operation 265, the first material is mated with a second material that passes both RBG and NIR bands, and is ideally of matching optical refractive index. In the exemplary embodiment, second material 266 is deposited (coated) directly on the first material 256 or joined by a cement of appropriate refractive index, using any known lens-stacking technique. The laminate of materials 256 and 266 then may function as NIRAF 205.

In an alternate embodiment illustrated by FIG. 2D, an NIRAF 205 is fabricated following method 270. A first material 266 that passes both NIR and RGB bands is received at operation 275. At operation 280, a second material 256 that passes RGB and blocks NIR is deposited on (or joined by cement) material 266. At operation 282 material 256 is micromachined to graduate the coating thickness spatially over the aperture radius. In the exemplary embodiment, material 256 is etched to form a parabolic recess 262. A third optically-neutral material may backfill recess 262, if desired.

Figure 3B:
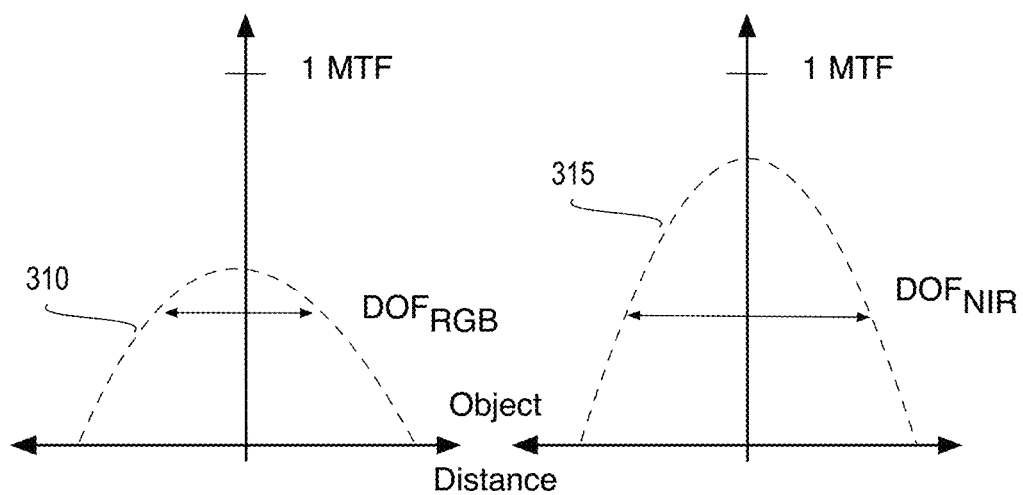
FIG. 3B illustrates a comparison of focus curves for a single lens system coupled to an NIR apodization filter, in accordance with some embodiments.

With the NIR aperture diameter reduced by the NIR apodization filter, DOF for the NIR band is increased relative to the RGB band. FIG. 3B illustrates a comparison of exemplary focus curves for a single lens system coupled to an NIR apodization filter, in accordance with some embodiments. As shown, RGB focus curve 310 varies with object distance in a manner dependent upon the optical modulation transfer function (MTF) associated with the lens system. RGB focus curve 310 is associated with a given f-number value (e.g., F2.2). The low f-number offers good low light performance, but the DOF is narrow. The $DOF_{RGB}$ has a length defined where focus curve 310 intersects a threshold level of sharpness (i.e., distance between the nearest and farthest object distance that appear acceptably sharp in an image data frame). NIR focus curve 315 displays the impact of the smaller apodized NIR aperture. NIR focus curve 315 is associated with a larger f-number (e.g., F11) for the NIR band. The high f-number has increased DOF. Apodization makes the NIR MTF less impacted by edge diffraction. In contrast to a dual binary aperture system therefore, the NIR sharpness curve 315 will have higher resolution throughout the focus curve so that the $DOF_{IR}$ is exceeds $DOF_{RGB}$ by a greater amount.

In embodiments, a separate NIR image data frame and RGB image data frame is collected for a given scene. In accordance with some embodiments having an NIR aperture of a diameter reduced by the NIR apodization filter, NIR signal level in most ambient conditions can be expected to be relatively small. A small NIR signal level advantageously reduces detrimental impact of NIR passage on RGB image quality. In accordance with some embodiments, an NIR flash source may be integrated into a CM platform in addition to a conventional RGB/visible flash source. The NIR flash source may be utilized to illuminate a scene with NIR light of one or more wavelength (e.g., 810 nm and/or 940 nm) during sensor sampling for an NIR image data generation. The NIR flash, invisible to the human eye, may be triggered to compensate the sensitivity drop caused by the reduced transmission characteristics of a single aperture with an NIR apodization filter.

An NIR flash source may be triggered when a strong NIR intensity signal from the CM is desired, for example to generate NIR image data that may be used to determine depth information as described further below. For such embodiments, the NIR flash source may be fired in a synchronized manner such that for one scene capture that produces a single RGB output image frame, first raw data is collected without NIR flash illumination as the basis for the RGB output image, and second raw image data is collected with NIR flash illumination. The second raw image data output by a CM that is associated with NIR flash illumination need not be directly utilized for anything more than enhancing the RGB output image, for example through DOF disparity dependent processing to determine image frame pixel depth values.

For some embodiments, an image sensor and/or color filter is configured to include a specific NIR channel, referred to herein as an "RGBNIR" sensor as opposed to an "RGB(NIR)" sensor that does not have an independent NIR channel. With this hardware capability, the NIR signal level will be accurately known and may be readily accounted for during a conversion from raw RGBNIR image data to processed output RGB image data. For such embodiments, NIR flash illumination may be utilized for all image sensor readouts (i.e., multiple scene captures that are with and without NIR flash may be avoided). In some further embodiments, a CM with a single aperture and NIR apodization filter is employed in a multi-camera system (e.g., stereo pair) that further includes at least a second CM utilizing a conventional hot mirror arrangement. With this arrangement, RGB image data output from a first CM that is NIR-responsive may be utilized for DOF disparity dependent processing (e.g., depth map generation), while processed RGB image data output by the platform may rely solely on raw RGB data that is output by the second CM with the hot mirror.

Figure 3C:
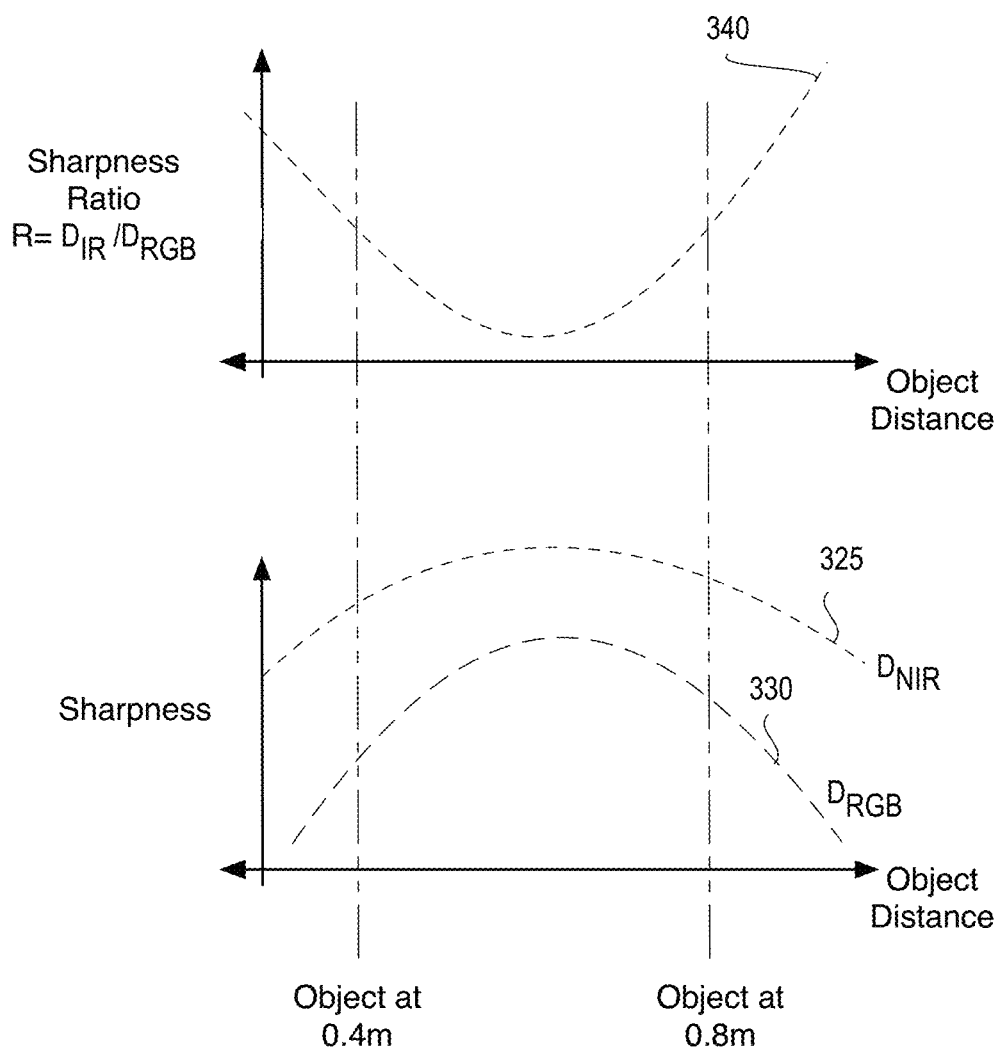
FIG. 3C illustrates a sharpness disparity function, in accordance with some embodiments.

In some embodiments, an integrated CM platform includes a microprocessor having logic circuitry (programmable or fixed function) operable to compute an NIR sharpness value and RGB sharpness value for pixels or scene positions within an image data frame. As noted above, a DOF disparity function may be computed based on NIR and RGB data received from one or more CM. A DOF disparity function characterizes the difference in DOF between NIR and RGB bands. The DOF disparity function may be formulated as a difference in NIR and RGB sharpness. FIG. 3C illustrates an exemplary sharpness disparity curve 340, in accordance with some embodiments. In the illustrated example, each point of an RGB sharpness curve 330 is an RGB sharpness value $D_{RGB}$ associated with a particular scene object distance. Likewise, each point of an NIR sharpness curve 325 is an NIR sharpness value $D_{NIR}$ associated with a particular scene object distance. Each point on the sharpness disparity curve 340 is a ratio of R of an NIR sharpness value $D_{NIR}$ over an RGB sharpness value $D_{RGB}$ associated with a given scene object distance.

In some embodiments, a depth value for one or more scene position in an RGB output image data frame is determined based on a predetermined sharpness disparity function (e.g., ratio R) computed from RGB input image data and NIR input image data. This predetermined sharpness disparity function may be characterized for a given CM as a part of OEM CM manufacture or CM platform manufacture, for example. In some embodiments therefore, an NIR/RGB sharpness disparity look up table, or other form of database, is stored to an electronic memory of a integrated CM platform. For the embodiment illustrated in FIG. 3C, such a look up table may be keyed off a $D_{NIR}/D_{RGB}$ ratio input, and output a corresponding object distance.

Figure 4:
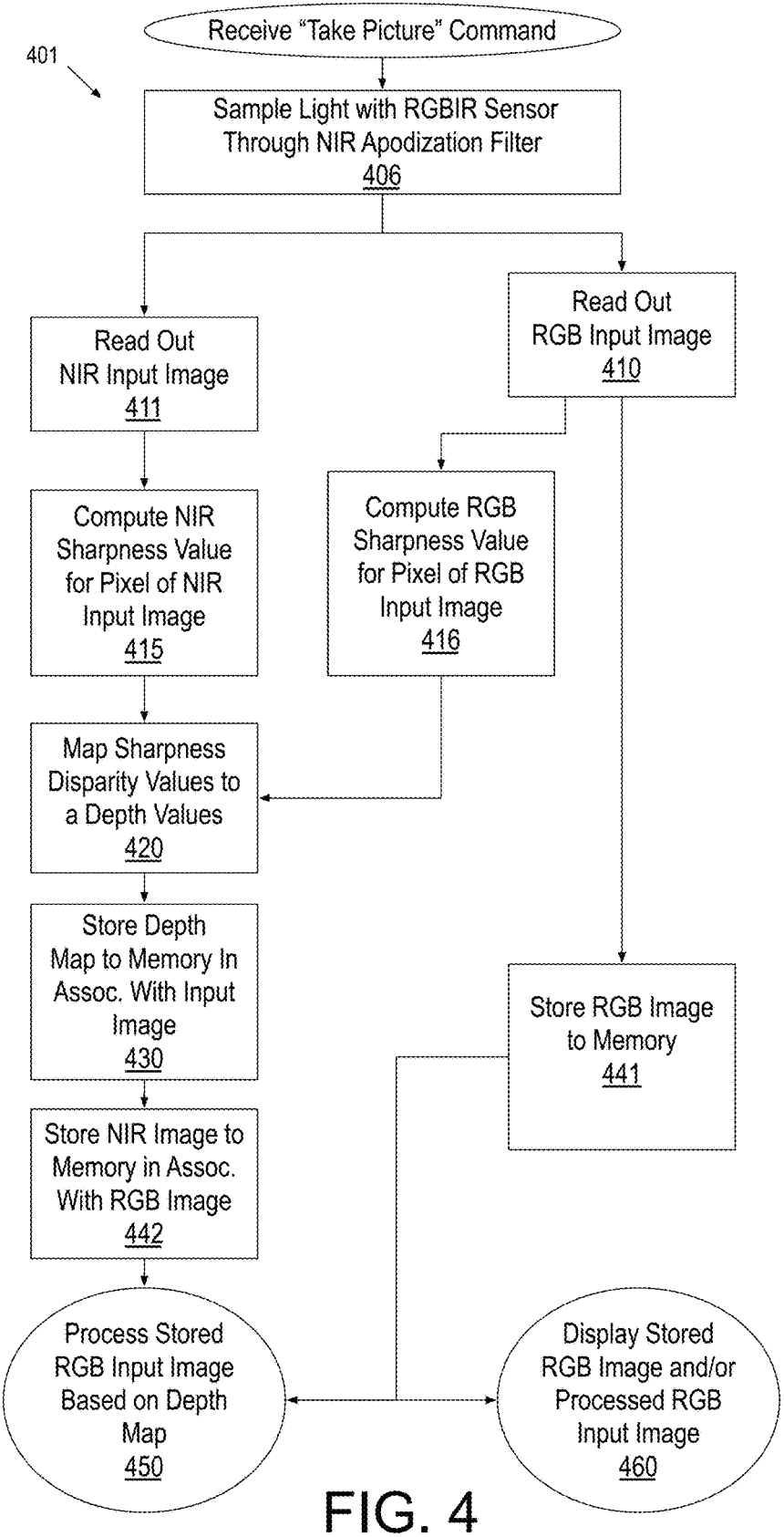
FIG. 4 is a flow diagram illustrating a method of determining depth information from a single lens system employing an NIR apodization filter, in accordance with some embodiments.

FIG. 4 is a flow diagram illustrating a method 401 for determining depth information from a single lens system employing an NIR apodization filter, in accordance with some embodiments. In some embodiments, method 401 is performed by platform 100. Method 401 begins with receiving a command to take a picture. The "take picture" command may have been initiated upstream of method 401 by a user's action, for example. At operation 406, light (scene object reflectance) is sampled with an RGB(NIR) sensor through an NIR apodization filter. In some embodiments, the CM 201 (FIG. 2A) or CM 202 (FIG. 2B) is employed at operation 406. The RGB(NIR) sensor may be any image sensor responsive to both RGB and NIR bands. At operation 410, an RGB input image is read out from the CM. In some embodiments the RGB input image is raw image data comprising RGB color values collected by the RGB(NIR) sensor while a real world scene is illuminated by ambient light or illuminated by an RGB flash. At operation 411, an NIR input image is read out from the CM. In some embodiments, the NIR input image is raw image data comprising NIR intensity values collected by the RGB(NIR) sensor while the real world scene is illuminated an NIR flash. In method 401, operations 410 and 411 are performed sequentially in time, with either operation performed first in time. In alternative multi-camera embodiments, if one CM employs a hot mirror, operations 410 and 411 may be performed concurrently.

At operation 415, an NIR sharpness value is computed for one or more pixel or scene position of the NIR input image frame. Sharpness computation at operation 415 may proceed by any known algorithm. In some embodiments, NIR sharpness values are computed from all pixels of NIR intensity contained in the NIR input image frame. For a high-resolution input image frame, the corresponding frame of NIR sharpness values may have VGA resolution, or better, depending on the algorithm employed and the level of noise deemed tolerable. At operation 416, an RGB sharpness value is computed for one or more pixel or scene position of the RGB input image frame. Sharpness computation at operation 416 may again proceed by any known algorithm. In some embodiments, an RGB sharpness value is computed from all pixels of color information in the RGB input image frame, matching the resolution of the frame of NIR sharpness values.

At operation 420, a depth value for the one or more scene positions in the RGB input image frame is computed based on the spatially correlated pair of NIR and RGB sharpness values computed at operations 415, 416. In an exemplary embodiment, for each pair of NIR and RGB sharpness values, a sharpness disparity value (e.g., ratio R from FIG. 3C) is computed. A predetermined sharpness disparity function is then evaluated for each sharpness disparity value. Alternatively, a predetermined look up table associating independent and dependent variables of the sharpness disparity function is accessed based on each computed sharpness disparity value, to arrive at a scene object distance. In some embodiments, operation 420 further entails a selection between candidate object distances where the sharpness disparity function is indeterminate.

Figure 5:
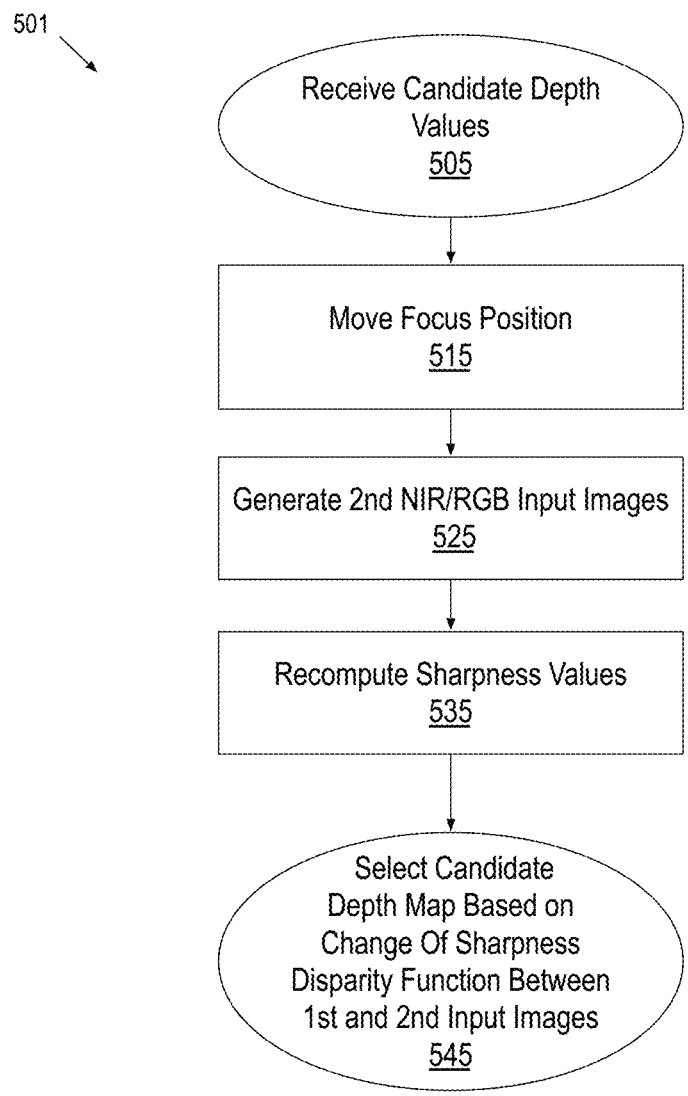
FIG. 5 is a flow diagram illustrating a method of selecting between candidate depth values, in accordance with some embodiments.

In further reference to FIG. 3C, the value of the sharpness disparity ratio R at object distance 0.4 meters is equal to the value of the ratio R at object distance 0.8 meters. Each pixel of an input image may therefore have two roots, associated with a far distance and a near distance. FIG. 5 illustrates a method 501 for selecting between a pair of candidate depth values, in accordance with some embodiments. At operation 505, candidate depth values associated with one or more pixels are received. At operation 515, a focus position is moved in a known direction relative to the focus position associated with the first input image used to generate the candidate depth values. At operation 525, a second NIR input image and a second RGB input image is generated with the same illumination conditions associated with the first NIR input image and first RGB input image, respectively. At operation 525, NIR and RGB sharpness values are recomputed based on the second input images substantially as described above. At operation 545, one of the candidate depth values is selected for each pixel or scene position based on the change of the NIR/RGB sharpness disparity. For example, in further reference to FIG. 3C, where the new focus position causes the sharpness disparity value to increase, the candidate distance for that pixel associated with a first side of the curve, is selected. Where the new focus position causes the sharpness disparity value to decrease, the candidate distance for that pixel associated with a second side of the curve is selected.

In alternative embodiments, a selection of candidate depth values is based instead on an evaluation of first and second NIR and RGB input images collected under different illumination conditions (e.g., different NIR flash intensities). In a further embodiment, the NIR flash intensity is modulated while a CM rolling shutter is active so that pseudo time of flight (TOF) stripes are generated in the second input image frame. The scene positions of a second input image frame having different NIR reflectance responses corresponding to the known change in NIR flash intensity further inform the scene shape in the depth dimension. The change in NIR intensity between two input image data frames for a static scene corresponds to a change in NIR reflectance of the scene objects associated with the NIR flash intensity change. A change in reflectance for a known change in illumination is dependent on object distance, with a larger change in reflectance occurring for nearer objects. Hence, candidate object distance roots may be selected based on an evaluation of changes in NIR data values for pixels in different stripes associated with different NIR flash intensity. The same type of computations may be performed for RGB information as well, if desired.

Returning to FIG. 4 with depth values determined, method 401 continues to operation 430 and the depth values are stored to an electronic memory in association with the RGB input image stored to memory at operation 441. The spatially correlated depth values form a depth map spanning the input image frame. The RGB image stored to memory at operation 441 may be raw image data, or may be an output image that has received any desired conversion, such as, but not limited to, color space conversion. With the depth map stored, in some embodiments the NIR input image data may be discarded. In the exemplary embodiment however, the NIR input image data is further stored to an electronic memory at operation 442. The NIR input image data is stored in association with the corresponding RGB image data. Method 401 may then complete at operation 450 where the stored RGB image frame is processed with any depth-based image algorithm known in the art, such as, but not limited to, depth-based image segmentation algorithm, occlusion detection algorithm, infilling algorithm, etc. In some further embodiments, the stored RBG image frame and/or the processed RGB image is displayed at operation 460, for example on a view screen integrated into the platform hosting the CM and microprocessor implementing the other operations of method 401.

Figure 6A:
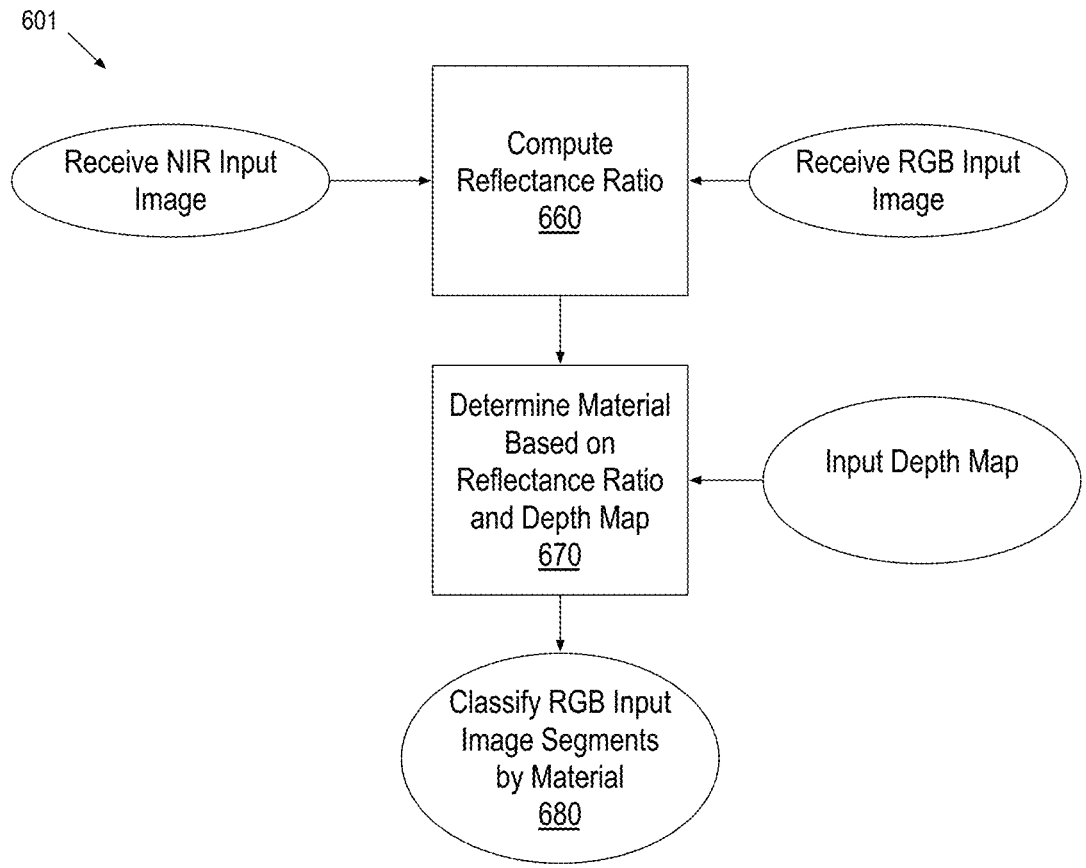
FIG. 6A is a flow diagram illustrating a method of classifying image segments by material, in accordance with some embodiments.

In some embodiments, in addition to generating a depth map based on NIR image data, an RGB input image is otherwise processed based at least in part on NIR image data. As one example, an ambient light temperature employed in AWB algorithms applied to the RGB image may be computed based in part on the NIR image data. In another exemplary embodiment, an RGB input image is segmented based at least in part on NIR image data. FIG. 6A is a flow diagram illustrating a method 601 for classifying image segments by scene object material, in accordance with some embodiments. Method 601 may also be implemented by the platform implementing method 401, for example, to segment an RGB image based on both the depth values mapped with method 401 and on an additional scene object characterization based on NIR information. Such a hybrid segmentation technique may prove more accurate than a segmentation technique based on depth information alone.

Figure 6B:
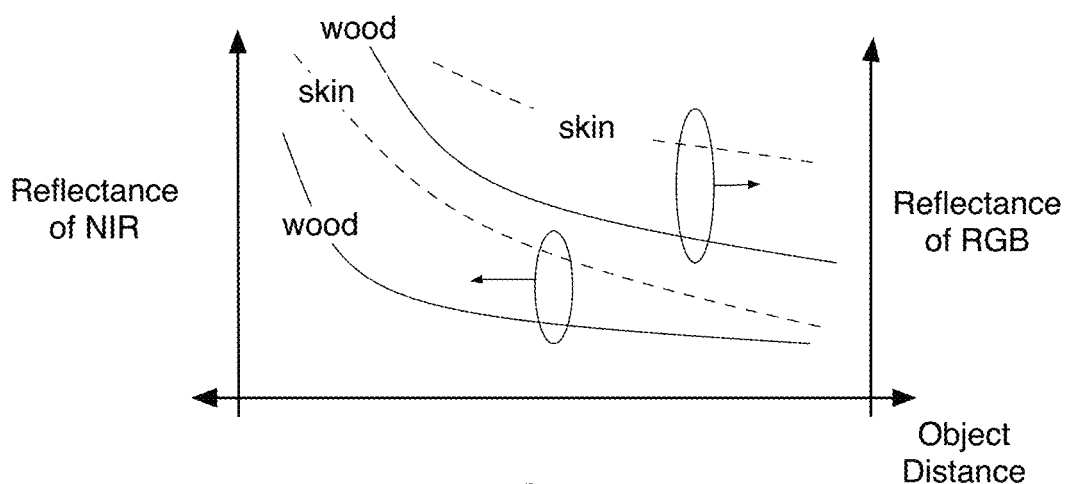
FIG. 6B is a graph illustrating reflectance of different materials as a function of object distance and spectrum band, in accordance with some embodiments.

Method 601 begins with receiving or accessing an NIR input image data frame and a corresponding RGB input image data frame. At operation 660, a reflectance ratio is computed as a ratio of an NIR intensity value and an RGB intensity value corresponding to a same scene location. At operation 670, each reflectance ratio value for on input image is associated with a material classification by evaluating predetermined reflectance ratio functions or accessing a predetermined reflectance ratio lookup table. FIG. 6B is a graph illustrating reflectance of different materials as a function of object distance and spectrum band, in accordance with some embodiments. The ratio of the NIR/RGB reflectance for many common scene materials may be unique function of object distance. In some embodiments therefore, predetermined reflectance ratio functions are evaluated, or a lookup table is indexed, based on each pixel's reflectance ratio and a pre-computed depth value to determine a resulting material label (e.g., wood, skin, etc.). At operation 680, a map of image segments is generated to spatially correlate the objects with the 2D image frame. The segment IDs may then be stored to an electronic memory in association with the input image for subsequent use. In some embodiments, for example, a 3A (autofocus, auto white balance, and auto exposure control) parameter is determined based on a color value of an object classified as skin based on method 601. This parameter value is then output to a camera module to control subsequent input image generation.

In some embodiments, differential NIR image data is computed for an RGB input image. Differential NIR image data may be advantageously more accurate than single-ended computations because of the impact of NIR in ambient light. As with the embodiments described above, differential NIR image data may be generated with a single CM or with a platform integrating multiple CM. In either case, two or more NIR image data frames are generated and each is associated with a different NIR flash intensity such that the same scene position is associated with a different reflectance.

Figure 7:
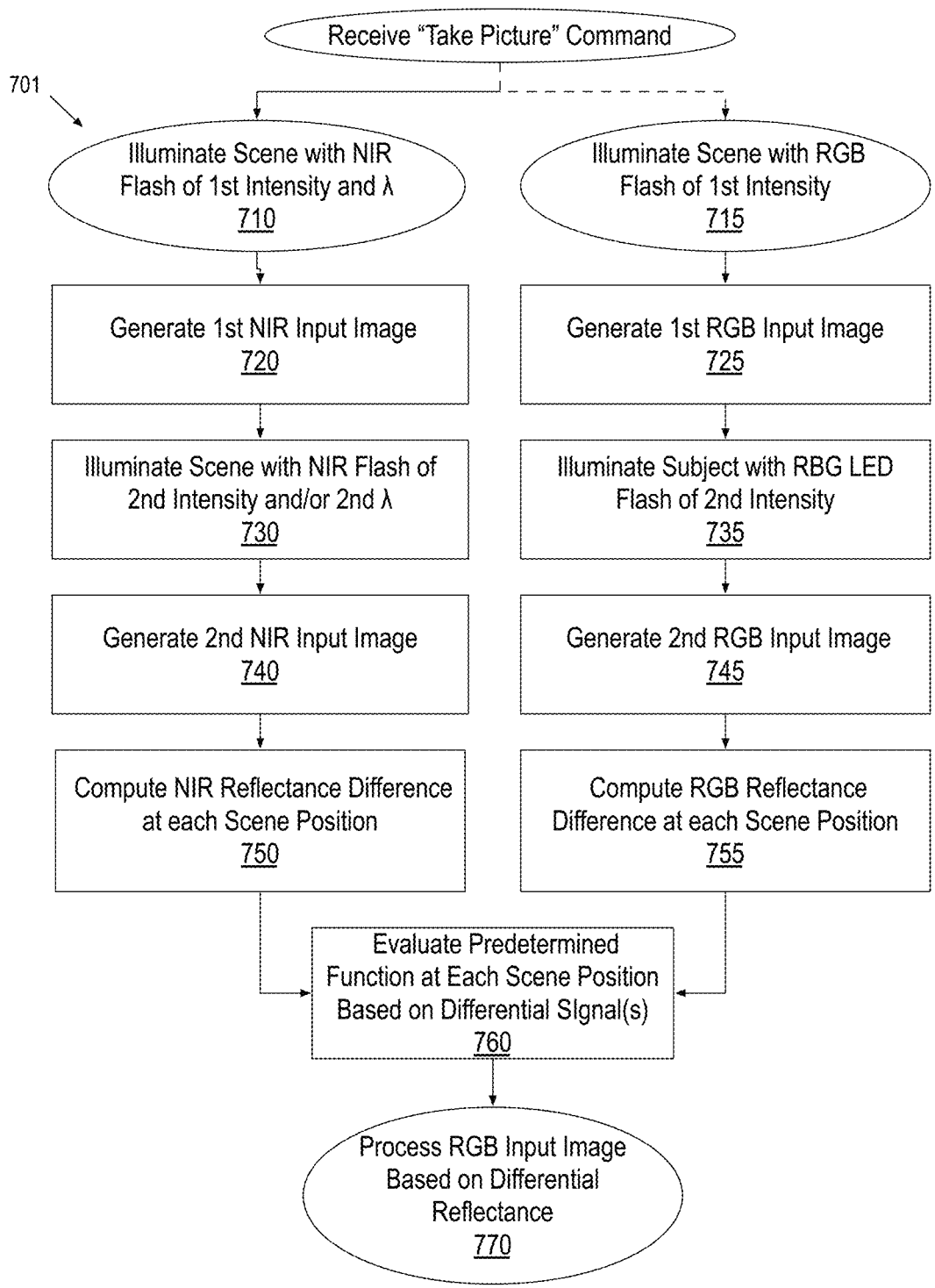
FIG. 7 is a flow diagram illustrating a method of determining differential reflectance information, in accordance with some embodiments.

FIG. 7 is a flow diagram illustrating a method 701 for determining differential reflectance information, in accordance with some embodiments. Method 701 is initiated with receipt of a "take picture" command. At operation 710, a scene is illuminated with an NIR flash of a first intensity and a first NIR wavelength, such as 810 nm. A first NIR input image is output from an RGB(NIR) sensor (or RGBNIR sensor) sampling multiple scene positions at operation 720. At operation 730, the scene is illuminated with an NIR flash of a second intensity and/or second NIR wavelength, at least one of which is different than the first. For example, the second NIR wavelength may be centered at 940 nm. A second NIR input image is output from the RGB(NIR) sensor sampling the multiple scene positions at operation 740. A difference in the NIR intensity values for each pixel of the image frame is computed at operation 750. With each NIR intensity value including a same ambient NIR condition, the ambient NIR effect is removed from the differential reflectance image generated at operation 750.

As further illustrated in FIG. 7, the same process may be implemented for a corresponding pair of RGB input images at operations 715, 725,735, 745, and 755. For these operations, multiple RGB flashes ensure ambient NIR levels can be subtracted out of a final RGB reflectance difference computed at operation 755. At operation 760, a predetermined function is evaluated (or an equivalent lookup table accessed) for each scene position or pixel location. The predetermined function may, for example, characterize a sharpness disparity between RGB and NIR image data, and/or an object distance, to improve depth calculation accuracy. In some embodiments, a differential NIR sharpness value and differential RGB sharpness value is computed for the one or more scene positions in the output image data frame based on the differential NIR and RGB information. A depth value for the one or more scene positions in the output image data frame is then determined at operation 770 based on the corresponding differential NIR sharpness value and differential RGB sharpness value.

Figure 8:
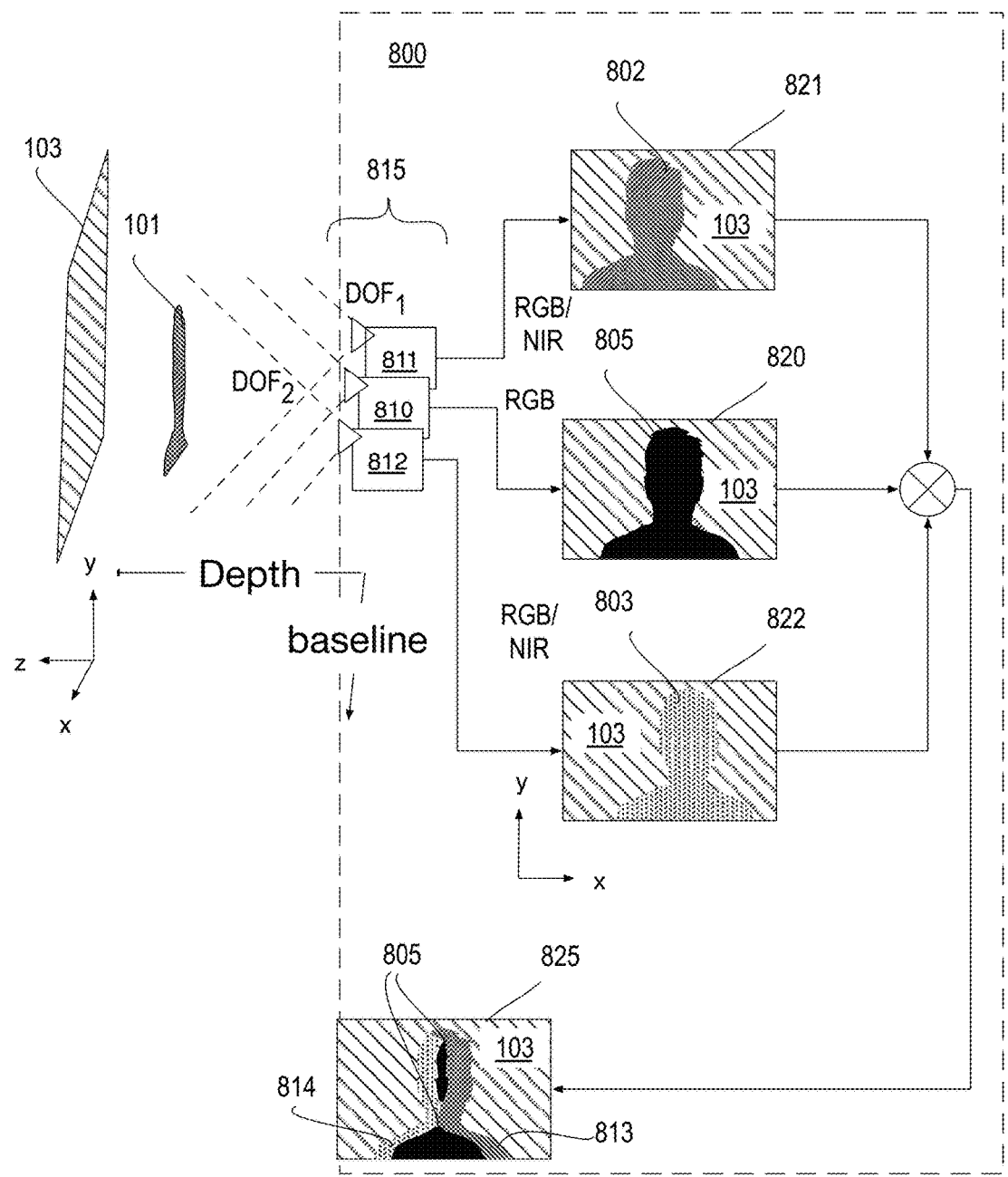
FIG. 8 is a schematic of a multi-camera platform, in accordance with some embodiments.

FIG. 8 is a schematic of a multi-camera platform 800, in accordance with some embodiments. A plurality of CM may be utilized by platform 800 to implement one or more of the methods described above, for example. Platform 800 includes an integrated or embedded digital image array camera 815 comprising a plurality of camera modules 810, 811, and 812 with a predetermined baseline relationship. In an exemplary embodiment where camera modules 810, 811, and 812 are on a mobile platform, the baseline vector between the reference CM 810 and each supplemental CM 811, 812 may have a length of tens of millimeters to tens of centimeters, depending on the form factor. Although in the exemplary embodiments three camera modules are illustrated, any number of camera modules and/or image sensors may be included in an array camera as embodiments herein are not limited in this respect.

At least one of the CM 810, 811, and 812 includes an RGB(NIR) sensor (or RGBNIR sensor) and NIR apodization filter. In one embodiment, CM 810 includes an RGB sensor (e.g. including a hot-mirror in the optical path) of higher resolution (e.g., 8 megapixel, or more) while both CM 811 and 812 includes an NIR apodization filter and RGB(NIR) sensor of lower resolution (e.g., 720p, HD, etc.). RGB image frame 120 may be designated as a reference and combined with depth data derived from RGB and/or NIR image frames 821 and 822 to generate an output RGB image frame 825 having depth information. In other embodiments, at least one of CM 811 and 812 includes an NIR apodization filter and RGBNIR sensor.

Each of the plurality of camera modules 810, 811, 812 output one or more image frame captured from a different camera viewpoint. In response to a "take picture" command, generation of input image frames 820, 821, and 822 may be triggered relative to an NIR flash and/or RGB flash of one or more intensity and one or more NIR wavelength. In some embodiments, an NIR flash of a first intensity and wavelength is triggered, and an associated pair of first NIR image data frames 821, 822 is generated. Frame 821 includes a representation 802 of a foreground object 101 and background 103 from a viewpoint of CM 811. Frame 822, includes a representation 803 of foreground object 101 and background 103 from a view point of CM 812.

At the first instant in time, frame 820 may be captured with NIR flash reflectance filtered out from a viewpoint of CM 810 that contains a representation 805 of foreground object 101 and background 103. Alternatively, at a second instant in time frame 820 may be captured without NIR flash illumination of the scene. Also at the second instant in time, second frames 821, 822 are captured by CM 811, CM 812 without NIR flash illumination to collect reference RGB information from the RGB(NIR) sensors. In some embodiments, at a third instant of time, a second NIR flash of a second intensity and/or second NIR wavelength is triggered, and a pair of second NIR image data frames 821, 822 are generated to enable differential NIR signal processing that may remove any effect of ambient NIR even if all sensors are RGB(NIR). For embodiments where at least one of CM 811 and 812 include an RGBNIR sensor, ambient light may be removed based on image data captured at the second instant in time.

Platform 800 may therefore generate a number of different image data sets including one higher resolution RGB image data frame with little to no NIR component, which may be utilized as the reference input image to be processed into an output image. The data set may further include a pair of lower resolution NIR image data frames associated with different viewpoints and a first NIR illumination, a pair of lower resolution RGB image data frames associated with the different viewpoints and having ambient NIR components, and a pair of lower resolution NIR image data frames associated with the different viewpoints and a second NIR illumination. Any of these additional data sets may all be used as inputs for the processing of the reference image.

In some embodiments, NIR/RGB sharpness disparity values are determined (e.g., according to one or more embodiment described elsewhere herein) for the two different viewpoints of CM 811 and CM 812. In further embodiments, multiple depth maps and/or differential NIR signals are computed for each CM viewpoint. Each depth map may be correlated across viewpoints using any known pixel correspondence technique and then averaged or otherwise filtered to reduce noise. Depth computations based on sharpness disparity may be further combined with any known depth computation based on optical parallax to further improve accuracy of the depth values generated from CM 811 and 812. In one exemplary embodiment, a depth map determined based on a parallax algorithm applied to RGB and/or NIR frames from CM 811 and 812 is employed to select between candidate depth values determined based on a sharpness disparity algorithm applied to RGB and NIR frames from one or more of CM 811 and 812. For example, the sharpness disparity-based depth value more closely matching that of the parallax-based depth value is selected. A parallax-based depth and a disparity-based depth may also be combined, for example by averaging.

In further embodiments, partially occluded target regions are detected based at least in part on NIR image data collected from a plurality of CM having an RGB(NIR) sensor (or RGBNIR sensor), any of which may have an NIR apodization filter. For example, in further reference to FIG. 8, a partially occluded region is a portion of target region in reference image frame 120 for which additional image data is available because that region is visible from camera/viewpoint 811 or 812. For example partially occluded regions 813 and 814 may be detected for target region 105 as a result of the viewpoint of CM 811, and CM 812, respectively. Only portions 805 of target region 105 are fully occluded from all camera viewpoints such that no image information about background region 103 is known. Partially and/or fully occluded regions may be efficiently detected using more stable NIR image data collected during NIR flash events. In some embodiments, fully occluded regions detected based on NIR data are then filled using any known infilling technique based on the RGB information collected with CM 811 and 812 for the pixel locations most relevant to these detected regions (e.g., edges of totally occluded region).

In some further embodiments where a platform integrates more than one camera with an NIR apodization filter (e.g., CM 811 and 812), the NIR band transmission profile of a first of the NIR apodization filters is different than the NIR band transmission profile of a second of the NIR apodization filters. Variation in apodization across cameras may improve occlusion detection accuracy. For example, where there is a larger difference in NIR intensity between the cameras than what is expected from a difference in f-number associated with the apodization difference, a fully occluded region may be designated.

Figure 9:
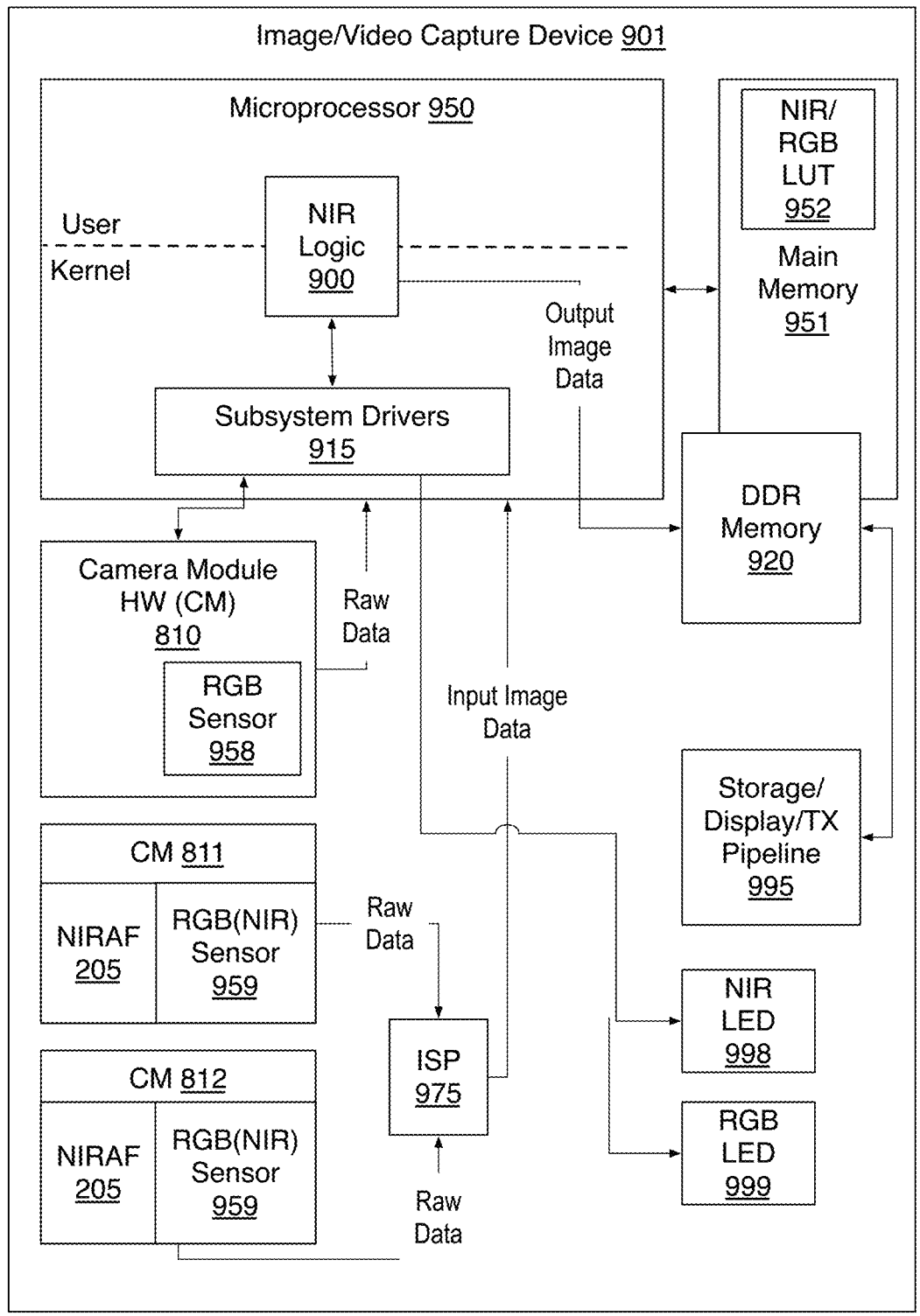
FIG. 9 is a block diagram of an image/video capture device including multiple CM, at least one of which utilizes an NIR apodization filter, in accordance with some embodiments.

FIG. 9 is a functional block diagram of an image/video capture device 901 including one or more CM, at least one of which includes an NIR-selective apodization filter, in accordance with embodiments. FIG. 9 further illustrates how a camera with an NIR-selective apodization filter may be integrated with various other components of image capture device 901 to provide enhanced image/video camera output. Image/video capture device 901, for example, may be a portion of a mobile computing device platform. Such a mobile computing device platform may be any device having an image processing system (e.g., a microprocessor configured to process image data), and a mobile power source or supply, such as one or more batteries, (not depicted). Examples of a mobile computing device platform include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device platform also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smartphone by way of example, it may be appreciated that other embodiments may be implemented using other wireless mobile computing devices as well.

Image capture device 901 includes CM 810, 811, and 812. In the exemplary embodiment, CM 810 further includes a hot-mirrored RGB camera sensor 958 while CM 811 and 812 each include an RGBNIR camera sensor 959 coupled to an NIR apodization filter (NIRAF) 205. In alternative embodiments, only one CM in platform 901 includes an NIRAF. Sensor 958 may be a HD, FHD, QXGA, WQXGA, QSXGA, or UHD format digital image device, for example. In some embodiments, sensor 958 has at least 8-megapixel resolution. Sensors 959 may be a HD, FHD, QXGA, WQXGA, QSXGA, or UHD format digital image device, for example. In some embodiments, sensors 959 have a lower pixel resolution than sensor 958, for example 1-5 mega pixel. Image capture device 901, may therefore generate three image frames concurrently, for example to provide NIR image data and/or image depth data for an RGB input image.

Camera sensors 958, 959 may provide a color resolution of 8 bits, or more per pixel, and be operable to capture continuous video frames progressively. Sensor 958 may have a pixel frequency of 170 MHz, or more. Sensors 958, 959 may include an RGB Bayer color filter, an analog amplifier, an A/D converter, other components to convert incident light into a digital signal corresponding to raw image data. Sensors 958, 959 may be controlled to operate a rolling shutter or electronic focal plane shutter process where pixels are read out progressively in a line-sequential fashion for a frame. In exemplary video embodiments, sensors 958, 959 output multiple consecutively exposed frames triggered in association with a triggering of an on-board flash illumination source, such as NIR LED 998 and/or RGB LED 999. CM 810, 811, and 812 may each output raw data associated with consecutively exposed frames in conformance with any known streaming protocol, such as a MIPI.

In the exemplary embodiment, raw image/video data output by CM 811 and 812 is input to ISP 975. ISP 975 is to receive and analyze frames of raw video data during the horizontal and/or vertical blanking periods associated with CM 811 and 812. During raw image data processing of RGB image data, ISP 975 may perform one or more of color space conversion, noise reduction, pixel linearization, and shading compensation, for example. In some embodiments, raw NIR image data is passed through ISP 975 to be processed downstream by a programmable microprocessor 950.

Image data output by ISP 975 may be buffered and queued as input image data ready for further image processing, such as sharpness disparity computation and/or depth value determination. In some embodiments, NIR image processing logic 900 includes logic to perform the NIR image data processing algorithms described elsewhere herein. In exemplary embodiments, microprocessor 950 implements DOF disparity dependent image processing 130 (FIG. 1), for example by executing method 401 (FIG. 4), and/or method 501 (FIG. 5). Microprocessor 950 may for example include one or more (programmable) logic circuits associated with NIR image data processing logic 900 to perform one or more stages of the depth information determination, such as one or more operation of method 401 described above. In some embodiments, NIR image processing logic 900 includes logic to determine depth values for scene positions within an RGB data frame received from CM 810. NIR image data processing logic 900 executes within a kernel space of an operating system (OS) instantiated by logic circuitry of microprocessor 950. In other embodiments, NIR image data processing logic 900 executes within a user space of a software stack managed by the OS.

Subsystem drivers 915 executing within a kernel space of an operating system (OS) instantiated by logic circuitry of microprocessor 950 may communicate various CM configuration parameters, such as 3A parameters, to one or more of CM 810, 811, or 812. Subsystem drivers 915 may also trigger NIR LED 998 and/or RGB LED 999 with coordination with actions of CM 810, 811, and 812. In some embodiments, any of the 3A parameters output by microprocessor 950 to CM 810, 811, or 812 may be based on image information determined from processing a prior image frame with NIR logic 900.

Both software and hardware implementations may be well suited to implementing NIR image data processing logic 900. For hardware implementations, NIR image data processing logic 900 may be implemented by fixed function logic, for example provided by a hardware accelerator (not depicted). For software implementations, any known programmable microprocessor, including a logic core of a central processor, an execution unit of a graphics processor, or a general vector processor, may be utilized to implement the logic of NIR image data processing logic 900.

As further illustrated in FIG. 9, output image data may be output to storage/display/transmission pipeline 995. In one exemplary storage pipeline embodiment, NIR image data, or depth data determined based on NIR image data, is written to electronic memory 920 (e.g., DDR, etc.) to supplement stored input image data. Memory 920 may be separate or a part of a main memory 951 accessible to microprocessor 950. Alternatively, or in addition, storage/display/transmission pipeline 995 is to transmit image NIR image data and/or input NIR image data off image capture device 901. In some embodiments main memory 951 stores one or more predetermined NIR/RGB look up table 952 accessed by microprocessor 950 to complete one or more NIR image data processing operation.

Figure 10:
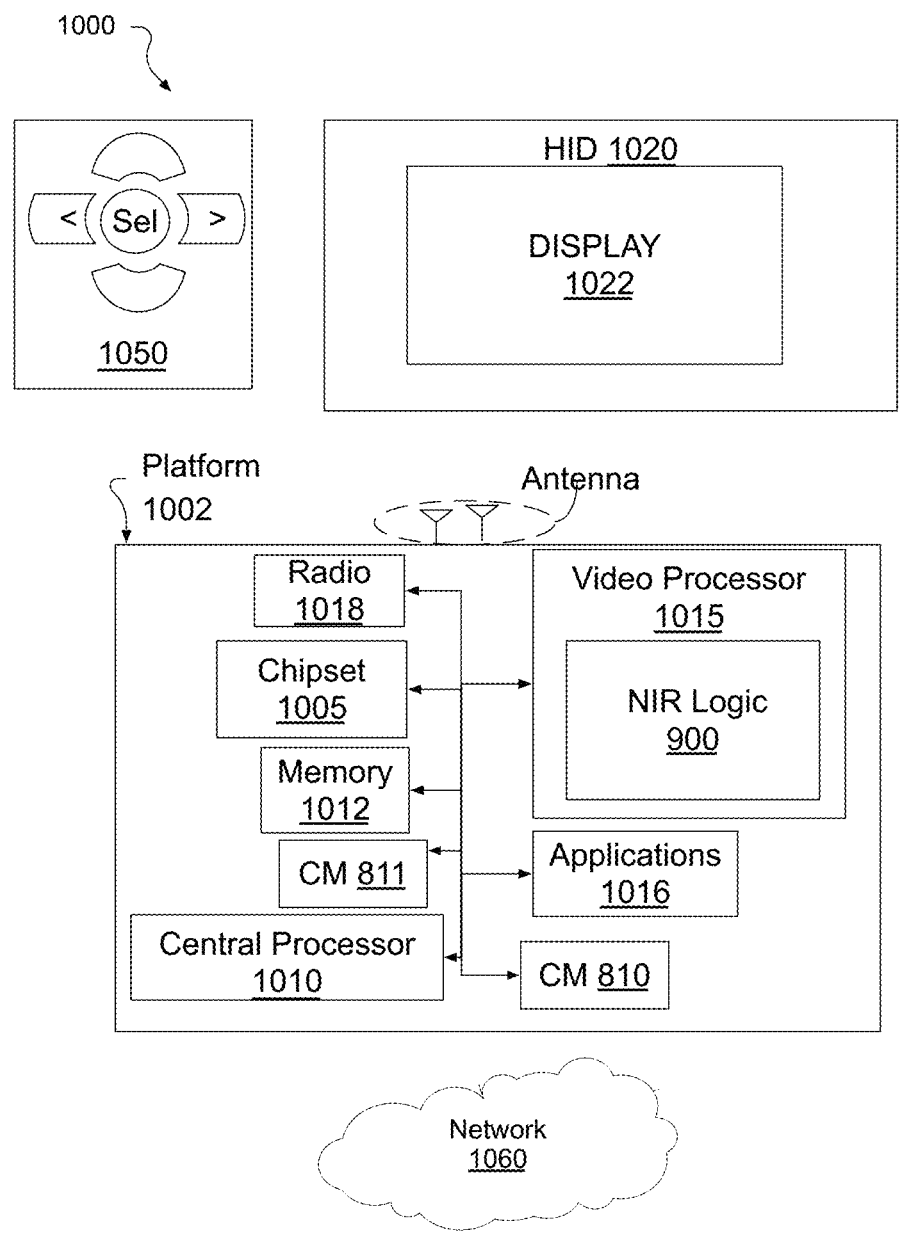
FIG. 10 is a diagram of an exemplary ultra-low power system including a processor with NIR image processing logic, in accordance with some embodiments.

FIG. 10 is a diagram of an exemplary ultra-low power system 1000 employing NIR image data processing logic 900, in accordance with one or more embodiment. System 1000 may be a mobile device although system 1000 is not limited to this context. System 1000 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

System 1000 includes a device platform 1002 that may implement all or a subset of the various NIR image data processing method described above in the context of FIG. 1-FIG. 9. In various exemplary embodiments, video/graphics processor 1015 executes NIR image data processing method, for example performing DOF disparity dependent image processing as described elsewhere herein. Video/graphics processor 1015 includes logic circuitry implementing NIR image data processing logic 900, for example as described elsewhere herein. In some embodiments, one or more computer readable media may store instructions, which when executed by central processor 1010 and/or video/graphics processor 1015, cause the processor(s) to execute one or more of the NIR image data processing operations described elsewhere herein. One or more RGB image data frames exposed by CM 810 and/or CM 811 may then be stored in memory 1012 in associated with NIR image data and/or depth data.

In embodiments, device platform 1002 is coupled to a human interface device (HID) 1020. Platform 1002 may collect raw image data with CM 810 and 811, which is processed and output to HID 1020. A navigation controller 1050 including one or more navigation features may be used to interact with, for example, device platform 1002 and/or HID 1020.

In embodiments, HID 1020 may include any monitor or display 1022 coupled to platform 1002 via radio 1018 and/or network 1060. HID 1020 may include, for example, a computer display screen, touch screen display, video monitor, television-like device, and/or a television.

In embodiments, device platform 1002 may include any combination of CM 810, CM 811, chipset 1005, processors 1010, 1015, electronic memory/storage 1012, applications 1016, and/or radio 1018. Chipset 1005 may provide intercommunication among processors 1010, 1015, memory 1012, video processor 1015, applications 1016, or radio 1018.

One or more of processors 1010, 1015 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 1012 may be implemented as a volatile memory device such as, but not limited to, a Random Access Memory (RAM), Dynamic Random Access Memory (DRAM), or Static RAM (SRAM). Memory 1012 may also be implemented as a non-volatile storage device such as, but not limited to flash memory, battery backed-up SDRAM (synchronous DRAM), magnetic memory, phase change memory, and the like.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The thresholded pixel value matching and associated object processes comporting with exemplary embodiments described herein may be implemented in various hardware architectures, cell designs, or "IP cores."

Figure 11:
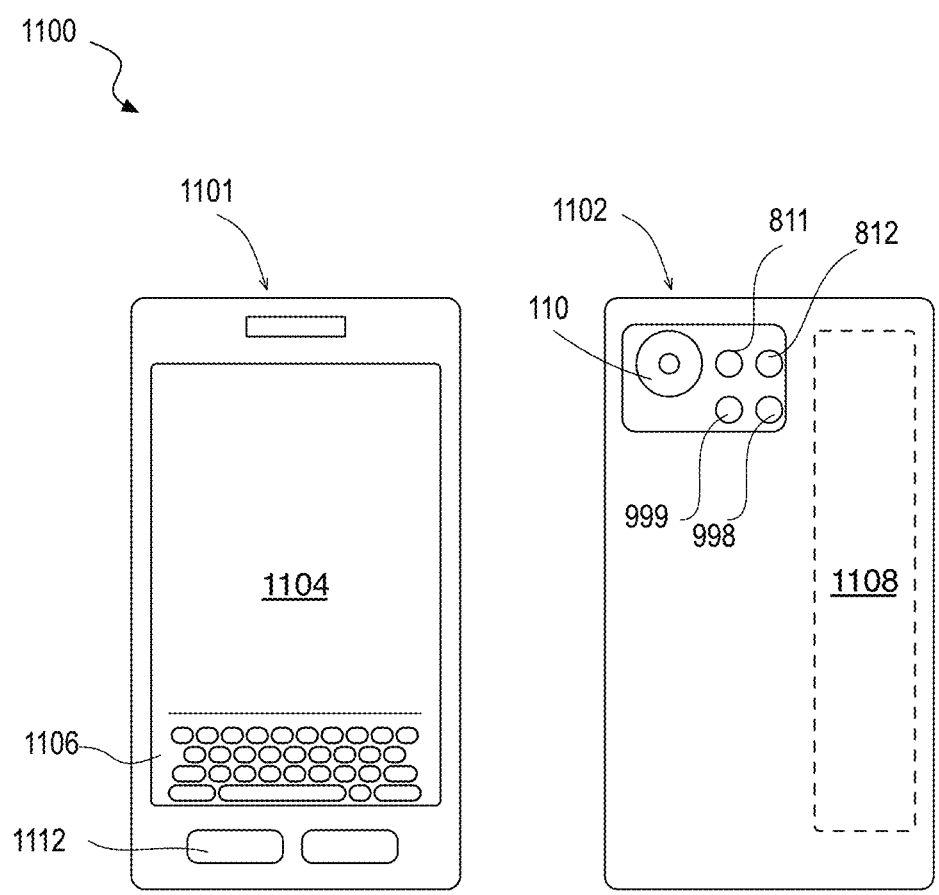
FIG. 11 is a diagram of an exemplary mobile handset platform, arranged in accordance with some embodiments.

As described above, system 1000 may be embodied in varying physical styles or form factors. FIG. 11 further illustrates embodiments of a mobile handset device 1100 in which device platform 901 and/or system 1000 may be embodied. In embodiments, for example, device 1100 may be implemented as a mobile computing handset device having wireless capabilities. As shown in FIG. 11, mobile handset device 1100 may include a housing with a front 1101 and back 1102. Device 1100 includes a display 1104, an input/output (I/O) device 1106, and an integrated antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. Embodiments are not limited in this context. Integrated into at least the back 1102 are apertures and/or lens systems associated with CM 110, 811, and 812 (e.g., each including a lens, an aperture, and an imaging sensor) through which image data is exposed and output to NIR image data processing logic 900, for example as described elsewhere herein. NIR LED 998 and RGB LED 999 are further embedded back 1102.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A digital image capturing apparatus, comprising: one or more camera hardware modules (CM), each including: an near-infrared (NIR) apodization filter with a continuously varying transmission profile for the NIR band and a non-zero transmission profile for the visible light (RGB) band;
   an image sensor responsive within both the RGB and NIR bands;
   and a lens system including one or more lens coupled to provide an optical path between an aperture and the image sensor, the optical path including the NIR apodization filter;
   and a microprocessor coupled to the CM, the microprocessor including logic circuitry to: receive input image data from the CM including at least RGB color information and NIR intensity information;
   and store the NIR information to an electronic memory in association with an output image data frame including the RGB information.

2. The apparatus of claim 1, wherein the transmission profile for the NIR band is different than the transmission profile for the RGB band.

3. The apparatus of claim 2, wherein the transmission profile within the NIR band peaks at a center of the optical path, and transmission profile within the RGB band varies less than the transmission profile within the NIR band.

4. The apparatus of claim 3, wherein the NIR apodization filter comprises a neutral density filter glass of varying thickness.

5. The apparatus of claim 1, wherein the microprocessor further includes logic circuitry to:
   compute an NIR sharpness value for one or more scene positions in the output image data frame based on the NIR intensity information;
   compute an RGB sharpness value for the one or more scene positions in the output image data frame based on the RGB color information;
   determine a depth value for the one or more scene positions in the output image data frame based on the corresponding NIR sharpness value and RGB sharpness value;
   and store the one or more depth values to the electronic memory in association with the RGB information.

6. The apparatus of claim 5, wherein the microprocessor further includes logic circuitry to:
   trigger a new focus position;
   compute a second NIR sharpness value and second RGB sharpness value for the one or more scene positions in a second output image data frame associated with the new focus position;
   select the depth value from a pair of candidate depth values based on a difference in a disparity between the NIR sharpness values and corresponding RGB sharpness values.

7. The apparatus of claim 1, wherein: the one or more CM further comprise a second CM including a second NIR apodization filter with a spatially varying transmission profile within the NIR band.

8. The apparatus of claim 7, wherein the NIR band transmission profile of a first of the NIR apodization filters is different than the NIR band transmission profile of a second of the NIR apodization filters.

9. The apparatus of claim 1, wherein the apparatus further includes: one or more NIR flash sources comprising one or more near-IR light emitting diodes (LEDs);
   and the microprocessor further includes logic circuitry to:
   trigger a first flash of the one or more NIR flash sources, the first flash of a first intensity at a first NIR wavelength;
   trigger a second flash of the one or more NIR flash sources, the second flash of a second intensity or wavelength different than the first;
   determine a first NIR reflectance value for the one or more scene positions in a first output image data associated with the first flash;
   determine a second NIR reflectance value for the one or more scene positions in a second output image data associated with the second flash;
   and compute differential NIR information for one or more scene positions in the output image data frame based on a difference between the first and second NIR reflectance values.

10. The apparatus of claim 9, wherein the microprocessor further includes logic circuitry to:
determine a first RGB reflectance value for the one or more scene positions in a first output RGB image data frame associated with the first flash;
determine a second RGB reflectance value for the one or more scene positions in a second output RGB image data frame associated with the second flash;
compute differential RGB information for one or more scene positions in the output RGB image data frame based on a difference between the first and second RGB reflectance values;
compute a differential NIR sharpness value and differential RGB sharpness value for the one or more scene positions in the output image data frames based on the differential NIR and RGB information;
and determine a depth value for the one or more scene positions in the output RGB image data frames based on the corresponding differential NIR sharpness value and differential RGB sharpness value.

11. The apparatus of claim 1, wherein the microprocessor further includes logic circuitry to:
detect an image segment;
detect a material associated with an image segment, or detect an image occlusion based on the NIR intensity information.

12. A computer-implemented method of capturing a digital image, comprising: triggering, at a
first instant in time, a near-infrared (NIR) flash of a first intensity and first wavelength to illuminate a real world scene;
generating a pair of first NIR image data frames associated with the first NIR flash intensity and two different camera viewpoints of the scene;
generating a first RGB image data frame associated with a first of the two different camera viewpoints; and storing the pair of first NIR image data frames to an electronic memory in association with the first RGB image data frame.

13. The computer-implemented method of claim 12, further comprising: computing an NIR sharpness value for one or more scene positions in a first of the NIR image data frames;
computing an RGB sharpness value for the one or more scene positions in the first RGB image data frame;
determining a depth value for the one or more scene positions in the first RGB image data based on the corresponding NIR sharpness value and RGB sharpness value;
and storing the one or more depth values to the electronic memory in association with the first RGB image data frame.

14. The computer-implemented method of claim 12, further comprising: generating a second RGB image data frame associated a second of the two different camera viewpoints;
detecting an occluded region in a first of the NIR image data frames based on a comparison with the second NIR image data frame;
and filling the occluded region in the first of the RGB image data frames based on the second RGB image data.

15. The computer-implemented method of claim 12, further comprising: triggering, at a second instant in time, a near-infrared (NIR) flash of a second intensity or a second wavelength to illuminate a real world scene;
generating at least a second NIR image data frame associated with the second NIR flash and one of the two different camera viewpoints of the scene;
and computing a differential NIR signal based on a comparison of the second NIR image data frame with one of the pair of first NIR image data frames.

16. The computer-implemented method of claim 15, further comprising: determining a first RGB reflectance value for the one or more scene positions in a first output RGB image data frame associated with the first flash;
determining a second RGB reflectance value for the one or more scene positions in a second output RGB image data frame associated with the second flash;
computing differential RGB information for one or more scene positions in the output RGB image data frame based on a difference between the first and second RGB reflectance values;
computing a differential NIR sharpness value and differential RGB sharpness value for the one or more scene positions in the output image data frames based on the differential NIR and RGB information;
and determining a depth value for the one or more scene positions in the output RGB image data frames based on the corresponding differential NIR sharpness value and differential RGB sharpness value.

17. One or more non-transitory computer-readable storage media, with instructions stored thereon, which when executed by a processor, cause the processor to perform a method comprising: triggering, at a first instant in time, a near-infrared (NIR) flash of a first intensity to illuminate a real world scene;
generating a pair of first NIR image data frames associated with the first NIR flash intensity and two different camera viewpoints of the scene;
generating a first RGB image data frame associated with a first of the two different camera viewpoints;
and storing the pair of first NIR image data frames to an electronic memory in association with the first RGB image data frame.

18. The media of claim 17, with further instructions stored thereon, which when executed by the processor, cause the processor to perform a method further comprising: computing an NIR sharpness value for one or more scene positions in a first of the NIR image data frames;
computing an RGB sharpness value for the one or more scene positions in the first RGB image data frame;
determining a depth value for the one or more scene positions in the first RGB image data based on the corresponding NIR sharpness value and RGB sharpness value;
and storing the one or more depth values to the electronic memory in association with the first RGB image data frame.

19. The media of claim 17, with further instructions stored thereon, which when executed by the processor, cause the processor to perform a method further comprising: generating a second RGB image data frame associated a second of the two different camera viewpoints;
detecting an occluded region in a first of the NIR image data frames based on a comparison with the second NIR image data frame;
and filling the occluded region in the first of the RGB image data frames based on the second RGB image data.

* * * * *